Patented Jan. 13, 1953

2,625,534

UNITED STATES PATENT OFFICE 2,625,534

RESINS AND PROCESS FOR PRODUCING SAME FROM REACTION PRODUCTS OF HYDROXY AROMATIC ALDEHYDES AND MERCAPTANS

Ralph B. Thompson, Hinsdale, Ill., assignor to Universal Oil Products Company, Chicago, Ill., a corporation of Delaware No Drawing. Application June 13, 1950, Serial No. 167,911

16 Claims. (Cl. 260—48)

This application is a continuation-in-part of my now abandoned co-pending application Serial Number 764,567 which was filed July 29, 1947.

This invention relates to a process for producing sulfur-containing resins.

An object of this invention is to prepare a clear resin.

Another object of this invention is to prepare a thermoplastic resin containing sulfur.

One specific embodiment of this invention relates to a process for preparing a resin which comprises reacting a hydroxy aromatic aldehyde and a mercaptan in the presence of an acidic catalyst, separating unconverted starting materials and catalysts from the reaction product, and heating said reaction product to form a resin.

Another embodiment of this invention relates to a process for preparing a resin which comprises reacting an orthohydroxy aromatic aldehyde and an alkyl mercaptan in the presence of an acidic catalyst, separating unconverted starting materials and catalysts from the reaction product, and heating said reaction product to form a resin.

A further embodiment of this invention relates to a process for preparing a resin which comprises reacting an orthophenolic aldehyde and an alkyl mercaptan in the presence of a hydrogen chloride catalyst, separating unconverted starting materials and catalysts from the reaction product, and heating said reaction product to form a resin.

A still further embodiment of this invention relates to a process for preparing a resin which comprises reacting an orthophenolic aldehyde and an alkyl mercaptan in the presence of hydrogen chloride catalyst, separating unconverted starting materials and catalyst from the reaction product, and heating said reaction product to form a resin.

According to this process a hydroxy aromatic aldehyde reacts readily with an alkyl mercaptan in the presence of an acidic catalyst to form a hydroxy aromatic dialkylthioacetal and this reaction product is converted into a resin by heating.

The hydroxy aromatic aldehydes include hydroxy phenyl aldehydes, hydroxy naphthyl aldehydes, and hydroxy aldehydes containing other aromatic nuclei. The hydroxy aromatic aldehydes preferred for use in the process are the orthohydroxy aromatic aldehydes, these compounds being those in which the hydroxyl and aldehyde groups are combined with adjacent carbon atoms of the aromatic ring. Salicylaldehyde is an example of such an ortho-substituted hydroxy phenyl aldehyde. Other hydroxy aromatic aldehydes are also utilizable in the process even though the hydroxyl and aldehyde groups are not in ortho position to one another. Thus a resinous product is obtained by the reaction of an alkyl mercaptan and vanillin, also referred to as 4-hydroxy-3-methoxybenzaldehyde.

Acidic catalysts suitable for promoting the process of this invention comprise hydrogen chloride, hydrogen bromide, phosphoric acids, particularly ortho, pyro, tri and tetra phosphoric acids, phosphorus pentoxide, and the like. Anhydrous hydrogen chloride is a particularly useful catalytic material as it may be added readily in controlled amounts to a reaction mixture comprising the hydroxy aromatic aldehyde and alkyl mercaptan.

Mercaptans suitable for use in the process are represented by the formula RSH in which R represents a member of the group consisting of an alkyl group, an aryl group, an alkaryl group, an aralkyl group, a cycloalkyl group, a cycloalkaryl group, and an alkcycloalkyl group. The lower alkyl mercaptans such as methyl, ethyl, propyl, isopropyl, n-butyl, isobutyl, sec-butyl and tertiary butyl, and the various amyl mercaptans are particularly useful in this process. Some of the lower boiling mercaptans including ethyl, propyl and isopropyl mercaptans are available in the form of a mercaptan mixture that is separated from sulfur-containing petroleum fractions by extraction with a solution of caustic soda dissolved in methanol. Other suitable mercaptan compounds of the class RSH include thiophenol, thiocresol, and the like, and other compounds in which the R group contains a substituent as in thioglycollic acid, mercaptoethanol, and other mecraptoalcohols.

The reaction of a hydroxy aromatic aldehyde with a mercaptan is illustrated by the following equation which shows the condensation of salicylaldehyde and an alkyl mercaptan.

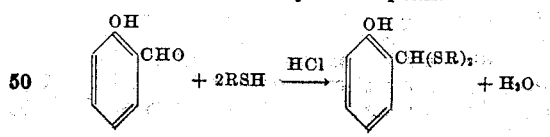

After the resultant thioacetal is freed from unconverted starting material and catalyst, as by washing and fractional distillation, the acetal is then heated to convert it into a resin. This heating is usually carried out at a temperature of from about 100° to about 350° C. and preferably at a temperature of from about 125° to about 275° C. It is sometimes advantageous to carry out this heat treatment at a subatmospheric pressure to produce a high quality resin.

This process is carried out either batchwise or in a continuous operation by mixing approximately one molecular proportion of the hydroxy aromatic aldehyde with about two molecular proportions of the mercaptans or of a mixture of mercaptans and then contacting this mixture with an acidic catalyst for a time sufficient to effect the condensation reaction to form an aromatic aldehyde dialkylthioacetal which is then separated from unconverted starting materials and catalysts and the purified thioacetal is then heated to form a resin. Unconverted starting materials recovered from the first step of the process are suitable for recycling thereto to produce an additional quantity of the thioacetal.

The resin formed by this process is useful as a coating material for paper, cloth, wood, metal, etc., or it may be mixed with fillers such as wood flour and/or other polymeric materials and molded into articles. Also some of the resins formed by this process are slightly tacky and can be used as a plasticizer for rubber and other elastomers.

The process is illustrated by the following examples which should not be misconstrued to limit unduly the broad scope of the invention.

*Example I*

One molecular proportion of salicylaldehyde was mixed with two molecular proportions of ethyl mercaptans and anhydrous hydrogen chloride was introduced into the reaction mixture at 20° C. Reaction of the salicyl aldehyde and ethyl mercaptan took place vigorously with evolution of heat. The resultant reaction product, salicylaldehyde diethylthioacetal, was washed with water to remove hydrogen chloride, it was then dried, and subjected to distillation, at a pressure of 2 mm. of mercury. Small amounts of unconverted starting material were removed by this distillation leaving a residue which set to a clear amber resin at a distillation still temperature of 140° to 160° C. This resin is useful as a coating material and can be molded with fillers or blended with other polymeric products.

*Example II*

15.2 grams (0.1 mole) of vanillin and 12.4 grams of ethyl mercaptan (0.2 mole) were dissolved in 50 cc. of diethyl ether at 20° C. and anhydrous hydrogen chloride was bubbled into the solution for about 15 seconds. Reaction occurred as evidenced by the evolution of heat and separation of water from the reaction mixture. After the reaction, the resultant mixture of reaction product and ether was washed with water to remove the hydrogen chloride, it was then dried and the ether was distilled off first at atmospheric pressure and later at a subatmospheric pressure. The residue in the distilling flask which consisted of a condensation product of vanillin and ethyl mercaptan (mainly vanillin diethylthioacetal) was then heated at 200° to 250° C. for 1 hour whereupon a resin was formed having an odor similar to that of cloves. This resin which is thermoplastic is slightly soluble in acetone but nearly insoluble in other organic solvents. It is slightly tacky and can be used as plasticizer or in suitable molding compositions.

I claim as my invention:

1. A process for preparing a resin which comprises heating the reaction product formed by reacting a hydroxy aromatic aldehyde having a hydroxy group attached to a ring carbon atom and ethyl mercaptan in the presence of an acidic catalyst, said heating being at a temperature and for a time sufficient to resinify said reaction product.

2. A process for preparing a resin which comprises heating the reaction product formed by reacting a hydroxy aromatic aldehyde having a hydroxy group attached to a ring carbon atom and an alkyl mercaptan in the presence of an acidic catalyst.

3. A process for preparing a resin which comprises heating the reaction product formed by reacting an aromatic aldehyde having a hydroxy group attached to a ring carbon atom in ortho position to the aldehyde group and an alkyl mercaptan in the presence of an acidic catalyst.

4. A process for preparing a resin which comprises heating the reaction product formed by reacting an orthophenolic aldehyde and an alkyl mercaptan in the presence of an acidic catalyst.

5. A process for preparing a resin which comprises heating the reaction product formed by reacting an orthophenolic aldehyde and an alkyl mercaptan in the presence of a hydrogen chloride catalyst.

6. A process for preparing a resin which comprises heating at a temperature of from about 125° C. to about 275° C. the reaction product formed by reacting a hydroxy aromatic aldehyde having a hydroxy group attached to a ring carbon atom and a mercaptan in the presence of an acidic catalyst, said heating being for a sufficient time to resinify said reaction product.

7. A process for preparing a resin which comprises heating at a temperature of from about 125° C. to about 275° C. the reaction product formed by reacting a hydroxy aromatic aldehyde having a hydroxy group attached to a ring carbon atom and an alkyl mercaptan in the presence of an acidic catalyst.

8. A process for preparing a resin which comprises heating at a temperature of from about 125° C. to about 275° C. the reaction product formed by reacting an aromatic aldehyde having a hydroxy group attached to a ring carbon atom in ortho position to the aldehyde group and an alkyl mercaptan in the presence of an acidic catalyst.

9. A process for preparing a resin which comprises heating at a temperature of from about 100° to about 350° C. the reaction product formed by reacting an orthophenolic aldehyde and an alkyl mercaptan in the presence of an acidic catalyst.

10. A process for producing a resin which comprises heating a hydroxy aromatic aldehyde dialkylthioacetal having a hydroxy group attached to a ring carbon atom at a temperature of from about 100° to about 350° C.

11. A process for producing a resin which comprises heating a phenolic aldehyde dialkylthioacetal at a temperature of from about 100° to about 350° C.

12. A process for producing a resin which comprises heating an orthophenolic aldehyde dialkylthioacetal at a temperature of from about 100° to about 350° C.

13. A resin formed by heating a hydroxy aromatic aldehyde dialkylthioacetal having a hydroxy group attached to a ring carbon atom at a temperature of from about 100° to about 350° C.

14. A resin formed by heating a phenolic aldehyde dialkylthioacetal at a temperature of from about 100° to about 350° C.

15. A resin formed by heating salicylaldehyde diethylthioacetal at a temperature of from about 100° to about 350° C.

16. A resin formed by heating vanillin diethylthioacetal at a temperature of from about 100° to about 350° C.

RALPH B. THOMPSON.

REFERENCES CITED

The following references are of record in the file of this patent:

Arkiv for Kemi, Mineralogi Och Geologi 15 A, No. 8, 1942 (page 5) Stockholm.